United States Patent
Lee et al.

(10) Patent No.: US 11,469,819 B2
(45) Date of Patent: Oct. 11, 2022

(54) METHOD OF TRANSMITTING SIGNALS IN VISIBLE LIGHT COMMUNICATION AND TERMINAL FOR SAME

(71) Applicant: LG Electronics Inc., Seoul (KR)

(72) Inventors: Hojae Lee, Seoul (KR); Dongkyu Kim, Seoul (KR); Bonghoe Kim, Seoul (KR); Sangrim Lee, Seoul (KR); Woonghee Lee, Seoul (KR); Kijun Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/425,210

(22) PCT Filed: Jan. 30, 2019

(86) PCT No.: PCT/KR2019/001272
§ 371 (c)(1),
(2) Date: Jul. 22, 2021

(87) PCT Pub. No.: WO2020/158971
PCT Pub. Date: Aug. 6, 2020

(65) Prior Publication Data
US 2022/0085884 A1 Mar. 17, 2022

(51) Int. Cl.
*H04B 10/116* (2013.01)
*H04B 10/54* (2013.01)
*H04B 10/69* (2013.01)

(52) U.S. Cl.
CPC ........ *H04B 10/116* (2013.01); *H04B 10/54* (2013.01); *H04B 10/69* (2013.01)

(58) Field of Classification Search
None
See application file for complete search history.

(56) References Cited

U.S. PATENT DOCUMENTS

| | | | | |
|---|---|---|---|---|
| 6,618,177 B1 * | 9/2003 | Kato | .......... | H04B 10/118 398/129 |
| 6,804,422 B1 * | 10/2004 | Bajorins | .......... | H04B 10/1123 385/33 |
| 2002/0097468 A1 * | 7/2002 | Mecherle | .......... | H04B 10/032 398/118 |

(Continued)

FOREIGN PATENT DOCUMENTS

KR 101486710 1/2015
KR 101676877 11/2016

OTHER PUBLICATIONS

Wang et al., "An adaptive scaling and biasing scheme for OFDM-based visible light communication systems", May 19, 2014, Optics Express, vol. 22, No. 10, pp. 12707-12715 (Year: 2014).*

(Continued)

*Primary Examiner* — David W Lambert
(74) *Attorney, Agent, or Firm* — Fish & Richardson P.C.

(57) ABSTRACT

Proposed is a signal transmission method for a transmitting end performing visible light communication. The signal transmission method for a transmitting end performing visible light communication comprises: a step of modulating a signal; and a step of applying analog dimming control on the modulated signal and transmitting same. Meanwhile, the analog dimming control may include biasing of the modulated signal, and scaling of the modulated signal.

10 Claims, 12 Drawing Sheets

(56) References Cited

U.S. PATENT DOCUMENTS

2010/0284690 A1* 11/2010 Rajagopal ............ H04B 10/116
 398/43
2016/0134366 A1 5/2016 Elgala et al.

OTHER PUBLICATIONS

Yang et al., "An Enhanced DCO-OFDM Scheme for Dimming Control in Visible Light Communication Systems", Jun. 2016, IEEE Photonics Journal, vol. 8, No. 3, 14 pages (Year: 2016).*
International Search Report and Written Opinion in International Appln. No. PCT/KR2019/001272, dated Oct. 28, 2019, 15 pages (with English translation).
Wang et al., "An adaptive scaling and biasing scheme for OFDM-based visible light communication systems," Optics Express, May 2014, 22(10)12707-12715.
Yang et al., "An Enhanced DCO-OFDM Scheme for Dimming Control in Visible Light Communication Systems," IEEE Photonics Journal, Jun. 2016, 8(3):1-13.

\* cited by examiner

Reverse polarity optical-OFDM (RPO-OFDM)

METHOD OF TRANSMITTING SIGNALS IN VISIBLE LIGHT COMMUNICATION AND TERMINAL FOR SAME

CROSS-REFERENCE TO RELATED APPLICATIONS

This application is a National Stage application under 35 U.S.C. § 371 of International Application No. PCT/KR2019/001272, filed on Jan. 30, 2019, the disclosure of which is incorporated by reference in its entirety.

TECHNICAL FIELD

The present disclosure relates to a method of transmitting a signal in visible light communication and, more particularly, to a method of reconfiguring a signal and configuring a reference signal during dimming control in a visible light communication system.

BACKGROUND

A next generation mobile communication system after a fourth generation (4G) mobile communication system assumes multi-party cooperative communication in which multiple senders and multiple receivers configure a network to exchange information. This serves to maximize information transmission rate and prevent occurrence of a communication shadow area. According to information theory, in such a communication environment, flexibly transmitting information by properly forming a multi-point channel over a network, rather than transmitting all information by forming a point-to-point channel, may be one method capable of further increasing transmission speed and may approximate total channel capacity of the network.

Visible light communication (VLC) is a communication medium using visible light (e.g., light having wavelengths of a range of about 400 to 700 nanometers (nm) that is visible to the human eye) to wirelessly transmit data (e.g., voice, data, numerical data, and image data). To transmit data using VLC, a visible light source, such as a fluorescent light bulb or a light emitting diode (LED), may be intensity-modulated or turned on and off at very high rates. A receiving device (e.g., a camera, or an imager or an ambient light sensor of a mobile phone) may receive intensity-modulated light and convert the intensity-modulated light into data that the receiving device is capable of processing for use and/or enjoyment by a user.

Since a VLC system uses a visible light bandwidth visible to the human eye rather than a radio frequency bandwidth, the VLC system may also function as lighting. Accordingly, the VLC system requires dimming control for the function of lighting.

SUMMARY

An object of the present disclosure is to provide a method of reconfiguring a signal and configuring a reference signal during dimming control in a VLC system.

The technical objects that can be achieved through the present disclosure are not limited to what has been particularly described hereinabove and other technical objects not described herein will be more clearly understood by persons skilled in the art from the following detailed description.

The object of the present disclosure may be achieved by providing a method of transmitting a signal by a transmitter performing VLC, including modulating a signal, and transmitting the modulated signal to which analog dimming control is applied. The analog dimming control may include biasing for the modulated signal and scaling for the modulated signal.

The analog dimming control may be performed by a voltage amplifier, a voltage-to-current (V-to-I) transducer, and an electrical-to-optical (E-to-O) device of the transmitter.

Application layer input and physical layer input may be used as input for the analog dimming control. The application layer input may include a dimming level demanded by a system, and the physical layer input may include a maximum power limit value of the transmitter and an inverse fast Fourier transform (IFFT) magnitude used to modulate the signal.

A maximum value may be applied to scaling for the modulated signal and a minimum value may be applied to biasing for the modulated signal.

Equal analog dimming control may be applied to a reference signal and to a data symbol in a unit time during which channel estimation is performed through the reference signal.

A receiver receiving the signal may obtain information related to biasing and scaling for the modulated signal using the reference signal.

According to an aspect of the present disclosure, a method of transmitting a signal in VLC may achieve the following effects.

First, since analog dimming control is performed based on signal scaling through adaptive biasing, additional gain may be obtained in terms of signal-to-noise ratio (SNR) as compared to legacy DC biasing.

Second, since the same scaling factor is applied to a reference signal and data, a receiver may decode a signal without additional signaling for the scaling factor. That is, scaling may act similarly to channel gain.

The above-described aspects of the present disclosure are merely some of the preferred embodiments of the present disclosure, and various embodiments reflecting the technical features of the present disclosure may be derived and understood by those skilled in the art based on the following detailed description of the disclosure.

BRIEF DESCRIPTION OF THE DRAWINGS

The accompanying drawings, which are included to provide a further understanding of the disclosure, provide embodiments of the present disclosure together with a detailed description.

DETAILED DESCRIPTION

Figure 1:
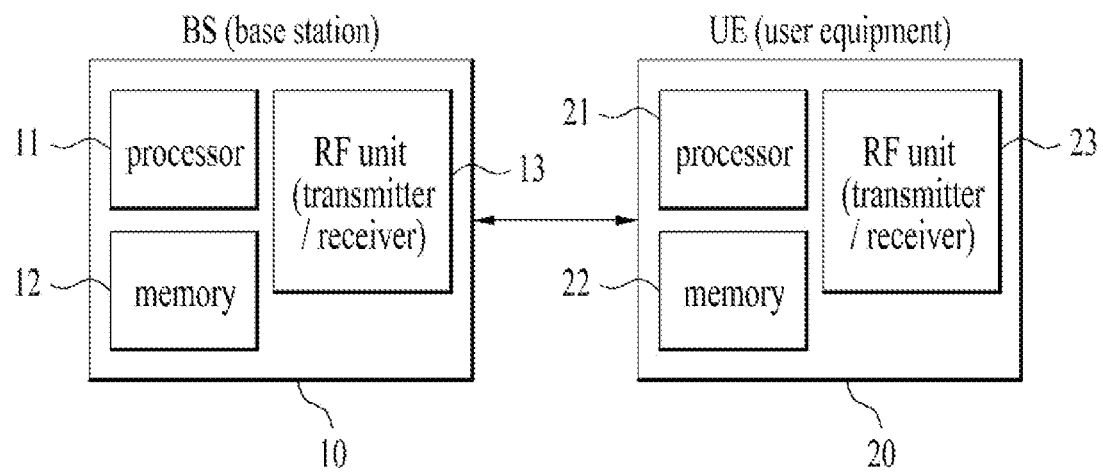
FIG. 1 is a diagram illustrating a system for implementing the present disclosure.

Hereinafter, reference will be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure. However, it is apparent to those skilled in the art that the present disclosure may be implemented without these details. For instance, although the following description is made in detail on the assumption that a mobile communication system includes a 3GPP LTE system, an LTE-A system, a 5G system, the following description is applicable to other random mobile communication systems in a manner of excluding unique features of the 3GPP LTE system, the LTE-A system, and the 5G system.

In some instances, known structures and devices are omitted or are shown in block diagram form, focusing on important features of the structures and devices, so as not to obscure the concept of the present disclosure. The same reference numbers will be used throughout this specification to refer to the same or like parts.

In the following description, it is assumed that a terminal collectively refers to a mobile or fixed user stage device such as a user equipment (UE), a mobile station (MS), an advanced mobile station (AMS), and the like. It is also assumed that a base station (BS) collectively refers to a random node of a network stage communicating with a terminal, such as a Node B, an eNode B, an access point (AP), a gNode B (gNB), etc.

In a mobile communication system, a UE may receive information from a BS on downlink (DL) and may transmit information to the BS on uplink (UL). Information transmitted or received by the UE may include various kinds of data and control information, and various physical channels are present according to types and usages of the information transmitted or received by the UE.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

The following detailed description includes specific terms in order to provide a thorough understanding of the present disclosure. However, it will be apparent to those skilled in the art that the specific terms may be replaced with other terms without departing the technical spirit and scope of the present disclosure.

FIG. 1 is a diagram illustrating a system for implementing the present disclosure.

Referring to FIG. 1, a wireless communication system includes a BS 10 and one or more UEs 20. On DL, a transmitter may be a part of the BS and a receiver may be a part of the UEs 20. On UL, the BS 10 may include a processor 11, a memory 12, and a radio frequency (RF) unit 13 (a transmitter and a receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive a radio signal. The UE 20 may include a processor 21, a memory 22, and an RF unit 23 (a transmitter and a receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive a radio signal. Each of the BS 10 and/or the UE 20 may have a single antenna or multiple antennas. When at least one of the BS 10 and the UE 20 has multiple antennas, the wireless communication system may be called a multiple input multiple output (MIMO) system.

In the present specification, while the processor 21 of the UE and the processor 11 of the BS perform operations of processing signals and data, except for a function of receiving and transmitting signals, performed respectively by the UE 20 and the BS 10, and a storage function, the processors 11 and 21 will not be particularly mentioned hereinbelow, for convenience of description. Although the processors 11 and 21 are not particularly mentioned, it may be appreciated that operations such as data processing other than signal reception or transmission may be performed by the processors 11 and 21.

The present disclosure proposes a variety of new frame structures for a fifth-generation (5G) communication system. In a next-generation 5G communication system, scenarios may be classified into enhanced mobile broadband (eMBB)/ultra-reliable machine-type communications (uMTC)/massive machine-type communications (mMTC), etc. eMBB is a next-generation mobile communication scenario having characteristics such as high spectrum efficiency, high user experienced data rate, and high peak data rate, uMTC is a next-generation mobile communication scenario having characteristics such as ultra-reliability, ultra-low latency, and ultra-high availability (e.g., vehicle-to-everything (V2X), emergency services, or remote control), and mMTC is a next-generation mobile communication scenario having characteristics such as low cost, low energy, short packet, and massive connectivity (e.g., Internet of Things (IoT)).

Figure 2:
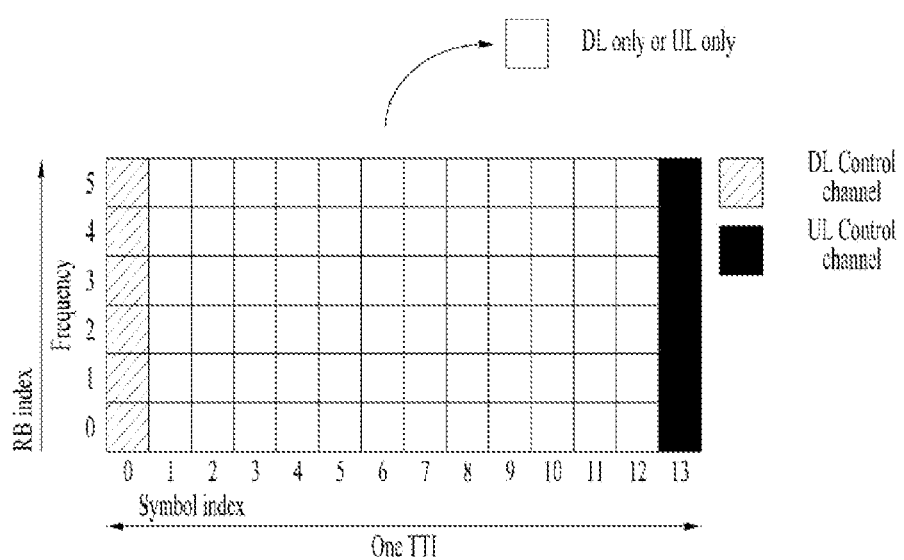
FIG. 2 is a diagram exemplarily illustrating a subframe structure in which a data channel and a control channel are subjected to time-division multiplexing (TDM).

FIG. 2 is a diagram exemplarily illustrating a subframe structure in which a data channel and a control channel are subjected to time-division multiplexing (TDM). For the purpose of minimizing latency in a 5G new RAT (NR), the frame structure in which the control channel and the data channel are subjected to TDM as illustrated in FIG. 2 may be considered as one frame structure.

In FIG. 2, a hatched area represents a transmission region of a physical downlink control channel (PDCCH) carrying downlink control information (DCI), and the last symbol represents a transmission region of a physical uplink control channel (PUCCH) carrying uplink control information (UCI). Here, the DCI, which is control information transmitted by an eNB to a UE, may include information about cell configuration that the UE should know, DL specific information such as DL scheduling, and UL specific information such as UL grant. In addition, the UCI, which is control information transmitted by the UE to the eNB, may include a hybrid automatic repeat request (HARQ) acknowledgement (ACK)/negative acknowledgement (NACK) report on DL data, a channel state information (CSI) report on a DL channel state, and a scheduling request (SR).

In FIG. 2, an area having no marks may flexibly configure a DL or UL duration for DL/UL flexibility. As an example, this area may be used for a data channel for DL data transmission (e.g., a physical DL shared channel (PDSCH)) or may be used for a data channel for UL data transmission (e.g., a physical UL shared channel (PUSCH)). According to this structure, since DL transmission and UL transmission are sequentially performed in one subframe, the eNB may transmit DL data and receive HARQ ACK/NACK for the DL data from the UE in the subframe. Consequently, a time required to retransmit data when a data transmission error occurs may be reduced, thereby minimizing the latency of final data transmission.

In this self-contained subframe structure, a time gap is required in order for the eNB and the UE to switch from a transmission mode to a reception mode or from the reception mode to the transmission mode. To this end, some OFDM symbols at the time of switching from DL to UL in the self-contained subframe structure are configured as a guard period (GP).

Visible Light Communication (VLC)

Since VLC or a visible light system uses a visible light band which is visible to the human eye, a lightning function is also performed. Therefore, for the function of the lighting, dimming control is required.

A general single-carrier system controls dimming through digital dimming control.

Figure 3:
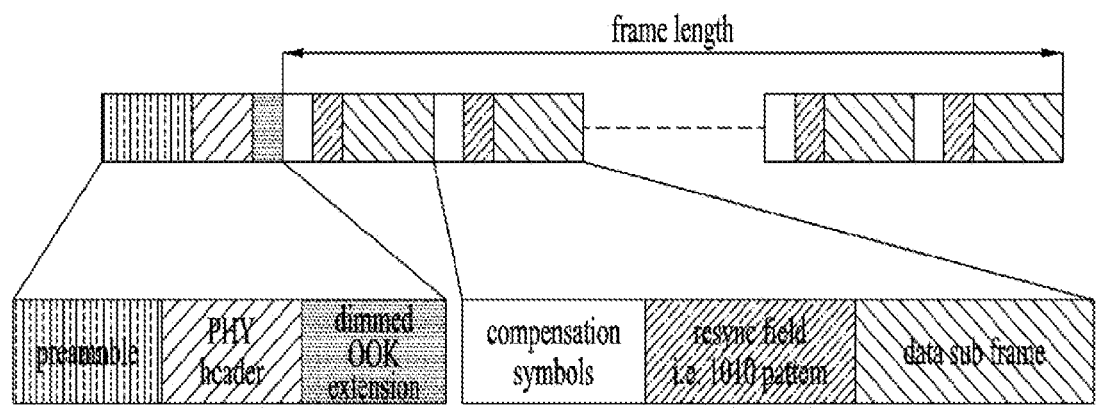
FIGS. 3 and 4 are diagrams illustrating digital dimming control of a single-carrier system.
Figure 4:
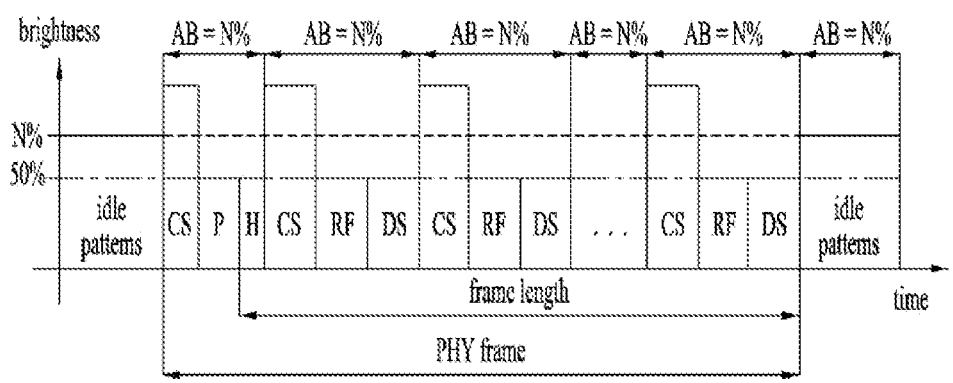

Digital dimming control, in particular, on-off keying (OOK) dimming control of IEEE 802.15.7 illustrated in FIGS. 3 and 4 has the following features.

Figure 5:
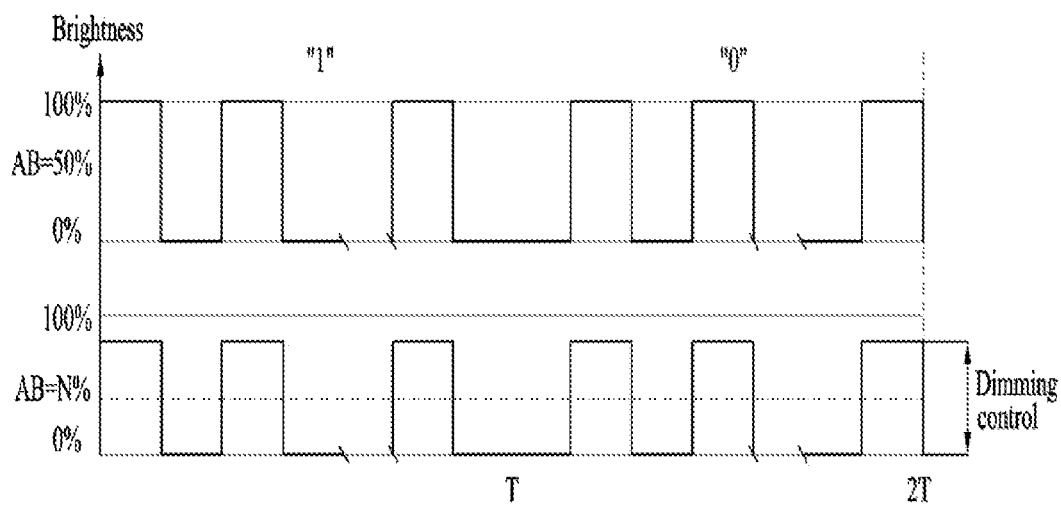
FIG. 5 is a diagram illustrating digital dimming control through amplitude control.
Figure 6:
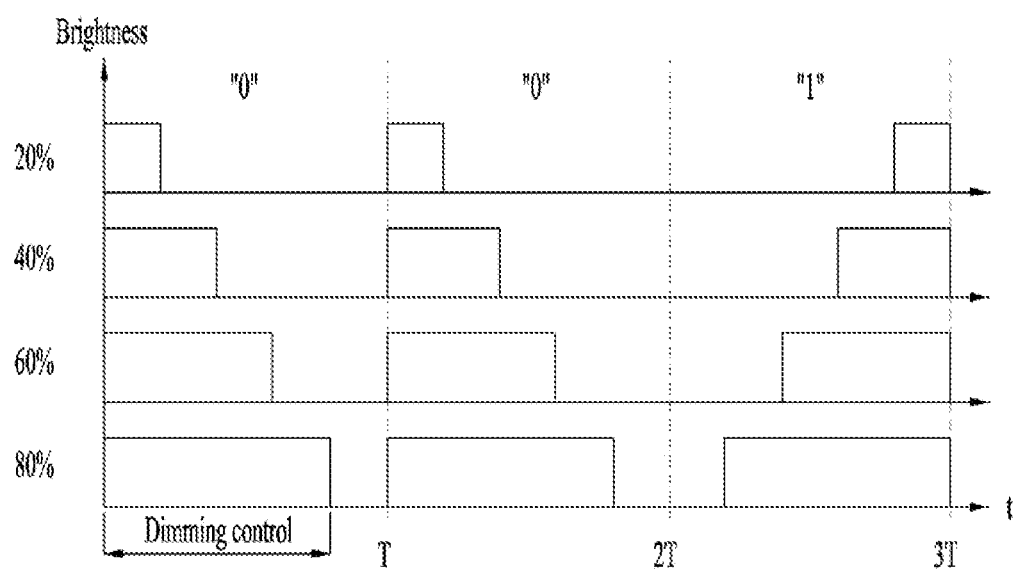
FIG. 6 is a diagram illustrating digital dimming control through pulse length control.

1) Refining the ON/OFF level—maintain same data rate, reliable communication range decrease at low dimming level 2) Controlling duty cycle 3) Applying symbol compensation—additional ON/OFF pulse 4) Brightness control by compensation symbol Digital dimming control includes dimming control through amplitude control as illustrated in FIG. 5 and dimming control through pulse length control as illustrated in FIG. 6.

In a VLC system, a study on a multi-carrier modulation (MCM) scheme is in progress.

As compared to a single-carrier modulation scheme, the MCM scheme is robust against multipath, is capable of using a single tap equalizer, and is robust against DC wandering and flickering interference. An MCM-based waveform for VLC should satisfy conditions that i) the waveform should have only one dimension (real-value) signal, and ii) the waveform should have a unipolar property.

Figure 7:
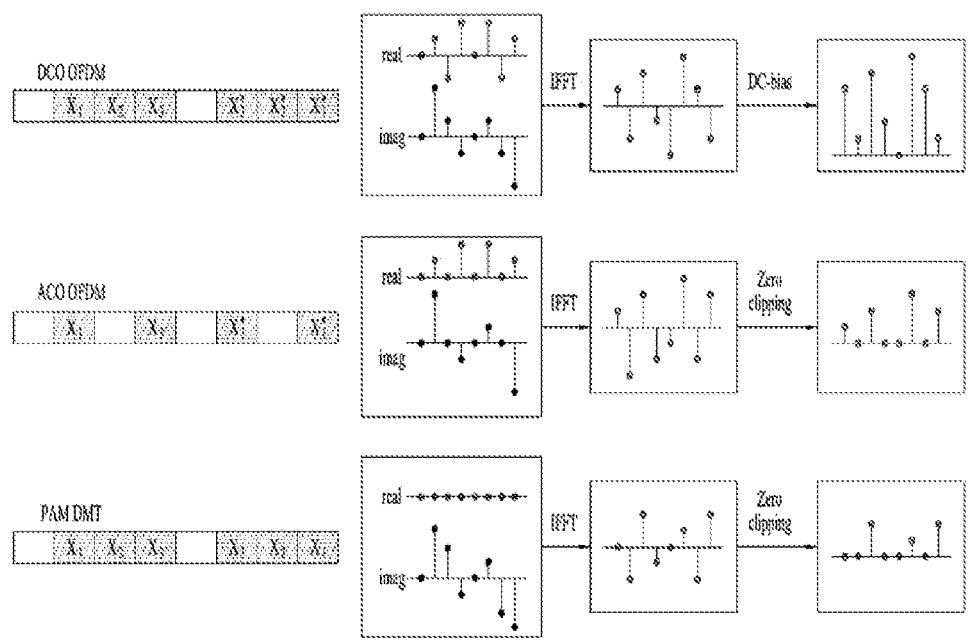
FIG. 7 is a diagram illustrating a multi-carrier modulation (MCM) scheme.

Various MCM schemes satisfying the above conditions have been introduced. These MCM schemes may be classified into DC-biased optical OFDM (DCO-OFDM), asymmetrically clipped optical OFDM (ACO-OFDM), and pulse-amplitude modulated discrete multi-tone modulation (PAM-DMT). Reference will now be made to FIG. 7 to describe the MCM schemes.

1) DCO-OFDM: DCO-OFDM has the first subcarrier mapping form of FIG. 7 to arrange modulated symbols Hermitian-symmetrically. A method of arranging symbols Hermitian-symmetrically means arranging symbols mirror-symmetrically in a conjugated form to the right and left based on a DC subcarrier. This arrangement method converts a symbol into a real value signal in the time domain. Next, the real value signal is biased by the smallest value (i.e., a negative value with a maximum amplitude) in the time domain, thereby generating a final unipolar time-domain signal.

2) ACO-OFDM: ACO-OFDM has the second subcarrier mapping form of FIG. 7 to arrange modulated symbols Hermitian-symmetrically while emptying modulated symbols corresponding to a half of the modulated symbols in DCO-OFDM by a predetermined interval.

In such subcarrier mapping, a waveform in the time domain has the form of a real value signal and repeatedly appears as a sign converted form. The repeatedly appearing waveform is zero-clipped to generate a final unipolar time-domain signal.

3) PAM-DMT: PAM-DMT has the third subcarrier mapping form of FIG. 7 to arrange a real value signal in an imaginary part in a PAM form to be flipped based on a center. In such subcarrier mapping, a waveform in the time domain has the form of a real value signal and repeatedly appears mirror-symmetrically as a sign inverted form. Like ACO-OFDM, the repeatedly appearing waveform is zero-clipped to generate a final unipolar time-domain signal.

Table 1 below shows performance measurement of each of the DCO-OFDM, ACO-OFDM, and PAM-DMT methods. Performance measurement may be spectral efficiency (SE), a peak-to-average power ratio (PAPR), a signal-to-noise ratio (SNR), and a bit error rate (BER).

TABLE 1

|  | SE | SNR | BER |
|---|---|---|---|
| DCO OFDM | O | X | X |
| ACO OFDM | X | O | O |
| PAM DMT OFDM | X | O | Δ |

Referring to Table 1, DCO-OFDM has SE of a half for a Hermitian symmetry property but this SE may be the most optimal SE in unipolar OFDM. However, DCO OFDM is disadvantageous in that an SNR characteristic is lowered as a power portion carried on a signal at actual transmit power is decreased by bias (a DC-bias value is constant and does not affect performance during modulated symbol detection at a receiver).

Referring to Table 1, ACO-OFDM has a disadvantage of having SE corresponding to half of SE of DCO OFDM. However, since ACO-OFDM does not require DC bias, all transmit power is carried on a desired signal and, therefore, a relatively good SNR property is obtained.

Referring to Table 1, PAM DMT has the same property as ACO OFDM in most cases. However, a distance characteristic between symbols is lowered because modulation is based on an one-dimensional amplitude rather than using a quadrature complex symbol, so that PAM DMT has lower BER performance than ACO OFDM.

Dimming Control in Multi-Carrier System

Figure 8:
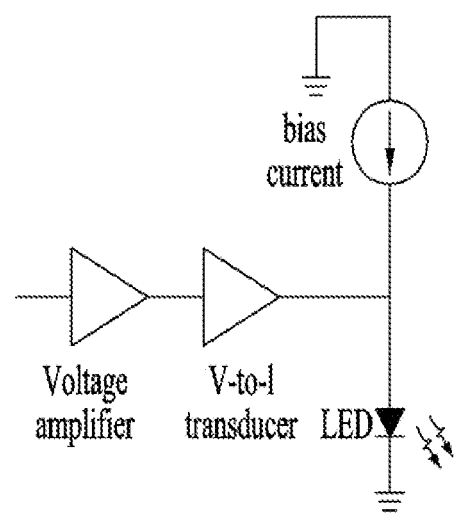
FIGS. 8 and 9 are diagrams illustrating a dimming control method of a legacy multi-carrier system.
Figure 9:
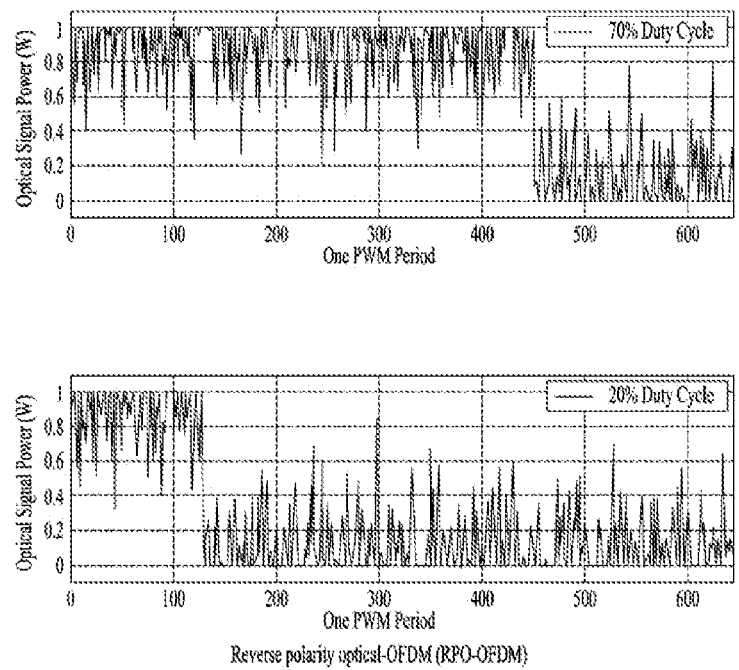

FIGS. 8 and 9 are diagrams illustrating a dimming control method of a legacy multi-carrier system.

In the legacy multi-carrier system, digital dimming control is applied to an analog signal. The legacy multi-carrier system illustrated in FIG. 8 controls an absolute magnitude of a signal by applying bias current (DC biasing). In terms of decoding, bias current is not a meaningful magnitude of a desired signal.

FIG. 9 shows that the legacy multi-carrier system preforms dimming control using a reverse polarity. The legacy multi-carrier system controls average power according to a duty cycle by reversely polarizing a part of a signal with respect to maximum power. Here, the duty cycle should be signaled for decoding.

Figure 10:
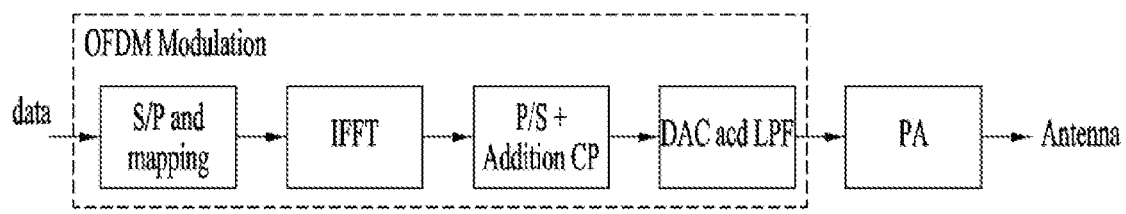
FIG. 10 is a diagram illustrating the structure of OFDM modulation of an RF communication system in terms of a transmitter.

FIG. 10 is a diagram illustrating an OFDM modulation structure in terms of a transmitter of a legacy RF communication system. Referring to FIG. 10, an analog signal after OFDM modulation is amplified through an RF power amplifier (PA). In this case, the maximum amplitude size of a signal may be limited by performance limitation of the PA.

Figure 11:
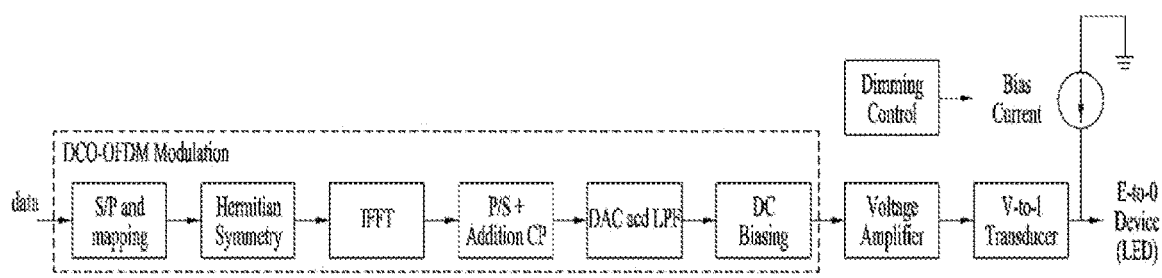
FIGS. 11 and 12 are diagrams illustrating the structure of a multi-carrier modulation transmitter of a VLC system.
Figure 12:
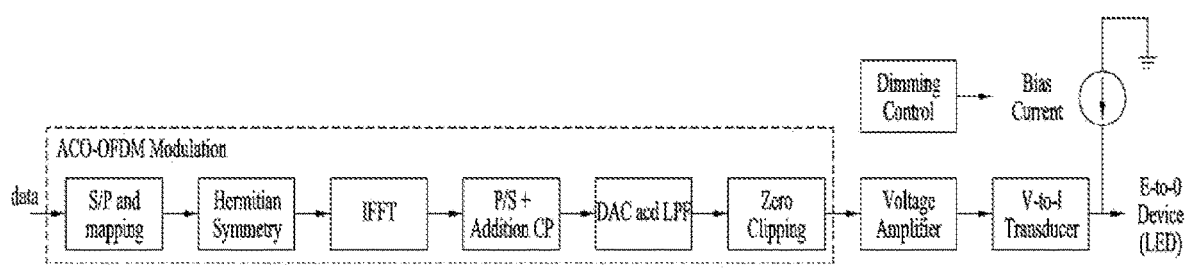

The structure of a multi-carrier modulation transmitter of a VLC system may be as illustrated in FIGS. 11 and 12. More specifically, FIG. 11 illustrates the structure of a DCO-OFDM modulation transmitter, and FIG. 12 illustrates the structure of an ACO-OFDM modulation transmitter of the VLC system.

In FIGS. 11 and 12, a voltage amplifier, a voltage-to-current (V-to-I) transducer, and an electrical-to-optical (E-to-O) device (e.g., LED) are devices having a non-linear characteristic. Therefore, an analog signal after modulation is amplified and converted. In FIGS. 11 and 12, dimming control based on DC biasing is exemplified. In the case of dimming control based on reverse polarity, dimming control may be performed through reconstruction of a signal.

Meanwhile, the above-described methods are methods of applying digital dimming control to an analog signal and have problems of being incapable of additional gain when a receiver decodes a signal. Therefore, a method of obtaining SNR gain when the receiver decodes a signal through analog dimming control is needed.

Analog Dimming Control for Increasing Decoding Performance in Receiver

According to an aspect of the present disclosure, an analog dimming control method for increasing decoding performance of the receiver while performing a lightning function in VLC is proposed. Dimming control through DC biasing in DCO-OFDM may be performed using the following method.

DC biasing value according to a demanded dimming level i: $DC_i = p_i - \bar{p}(\hat{x}_t)$ s.t. $DC_i \geq 0$, s.t. $\max(P(x_t)) + DC_i \leq PA_{limit}$ Here, the above information is defined as follows.

Biasing value for the demanded i-th dimming level: $DC_i$

Mean power of time domain symbols for the demanded i-th dimming level:

$$p_i = \bar{p}(\hat{x}_t) + DC_i;$$

Limitation condition of power amplifier: $PA_{limit}$ (determined by non-linear device)

Frequency domain symbol vector: $X_f$

Time domain symbol vector: $x_t = IFFT(X_f)$

Unipolar time domain symbol vector: $\hat{x}_t = x_t - \min(x_t)$ (for DCO-OFDM), $\hat{x}_t = x_t$ (for ACO-OFDM)

Mean power of time domain signal: $\bar{p}(\hat{x}_t) = \text{mean}(\hat{x}_t^2)$ Power of time domain symbols: $P(\hat{x}_t) = \hat{x}_t^2$ FFT size: N In ACO-OFDM, dimming control based on DC biasing may be performed using the same method as in DCO-OFDM and there is a difference only in signal conversion by zero clipping without biasing based on a minimum value in calculating the unipolar time domain symbol vector (unipolar time domain symbol vector: $\hat{x}_t = \text{zero clipping}(x_t)$). Similarly, the above method may be equally applied to other multi-carrier systems.

That is, as illustrated in FIGS. 11 and 12, a DCO/ACO-OFDM modulation transmitter of a VLC system DC-biases signal strength applied to an LED through current control of bias current based on dimming control. Dimming control according to a dimming level may be performed as illustrated in FIG. 13 through the DC biasing value obtained by the above-described equation.

Figure 13:
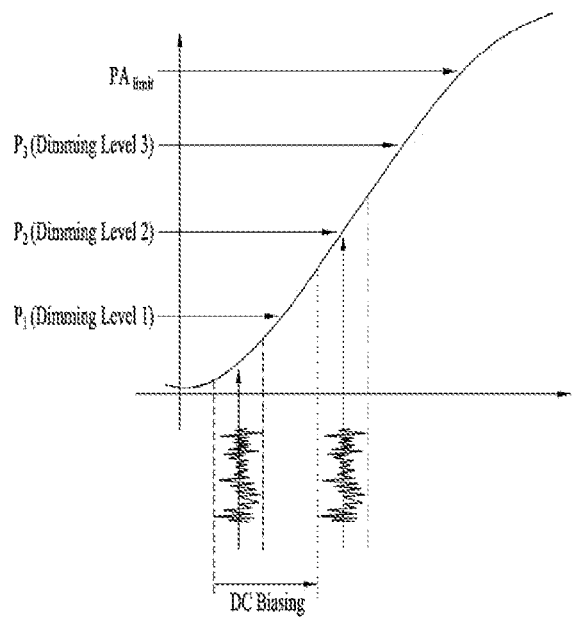
FIG. 13 is a diagram illustrating dimming control according to a dimming level of a VLC system.

FIG. 13 is a diagram illustrating a method of performing dimming control based on DC biasing through bias current for a non-linear device.

In dimming control through DC biasing illustrated in FIG. 13, since a biasing value in terms of the receiver is a constant value, it is difficult to acquire SNR gain. In addition, since the constant value in signal power is information to be eliminated for decoding, a ratio of a desired signal power in terms of the SNR is reduced as compared with a fixed noise power, so that there may be SNR loss.

On the other hand, in legacy RF communication, strength of an analog signal modulated in a baseband is amplified through a PA. The magnitude of the signal may be scaled to the maximum within a limited range of the PA. That is, in order to maximize SNR gain in terms of reception, strength of a signal needs to be amplified through scaling. However, since dimming control in the VLC system is an essential operation element, a method of performing dimming control while maintaining maximum scaling is needed.

Implementation 1: Analog Dimming Control for VLC

In the VLC system, dimming control through minimum DC biasing should be performed while using maximum signal amplification scaling for an analog signal in consideration of SNR gain of the receiver. To this end, according to an aspect of the present disclosure, a transmitter for controlling a scaling value and a biasing value for a non-linear device based on an analog dimming control unit is proposed.

Figure 14:
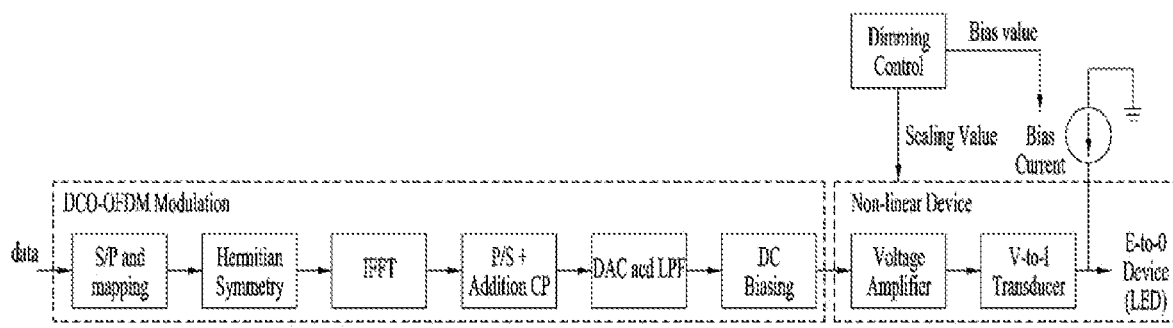
FIG. 14 is a diagram illustrating application of an analog dimming control unit in the structure of a DCO-OFDM modulation transmitter of a VLC system.

FIG. 14 is a diagram illustrating application of an analog dimming control unit in the structure of a DCO-OFDM modulation transmitter of a VLC system. Referring to FIG. 14, the analog dimming control unit derives an optimal bias value and an optimal scaling value satisfying a demanded dimming level based on a time-domain analog signal generated through DCO-OFDM modulation and indicates scaling in the non-linear device and biasing in bias current. The optimal biasing value and the optimal scaling value may be derived by the following algorithms Implementation 1 Algorithm 1 (DC Biasing is Performed after Signal Scaling)

Algorithm 1 is an analog dimming control algorithm for minimizing a biasing value while maximizing a scaling value in order to maximize SNR gain of a receiver signal. Algorithm 1 means performing signal scaling through a voltage amplifier and/or a V-to-I transducer of the non-linear device of FIG. 14 and then performing DC biasing through bias current.

A signal scaling value and a DC biasing value according to a demanded dimming level i is as follows.

1) Object to. $\max(s_i - DC_i)$
2) Subject to. 2-1) $s_i \leq s_m$, 2-2) $DC_i \geq 0$
2-3) $s_i \cdot \max(P(x_t)) + DC_i \cdot PA_{limit}$, 2-4) $(\Sigma_j^N s_i \cdot (x_t^j) + DC_i)/N = P_i$ Here, the above information is defined as follows.

1) Biasing value for the demanded i-th dimming level: $DC_i$
2) Mean power of time domain symbols for the demanded i-th dimming level: $p_i$
3) Scaling value for the demanded i-th dimming level: $s_i$
4) Maximum scaling value: $s_m = PA_{limit}/\max(P(x_t))$
5) Limited condition of power amplifier: $PA_{limit}$ (determined by non-linear device)
6) Frequency domain symbol vector: $X_f$
7) Time domain symbol vector: $x_t = \text{IFFT}(X_f)$
8) Unipolar time domain symbol vector: $\hat{x}_t = x_t - \min(x_t)$ (for DCO-OFDM), $\hat{x}_t = x_t$ (for ACO-OFDM)
9) Mean power of time domain signal: $\bar{p}(\hat{x}_t) = \text{mean}(\hat{x}_t^2)$
10) Power of time domain symbols: $P(\hat{x}_t) = \hat{x}_t^2$
11) FFT size: N As illustrated in FIG. 14, a DCO-OFDM modulation transmitter of the VLC system i) scales a time-domain analog signal through a scaling value $s_i$ derived by the analog dimming control unit and ii) DC-biases the strength of the time-domain analog signal applied to an LED through bias current control based on a biasing value $DC_i$. Dimming control according to a demanded dimming level may be performed through the scaling value $s_i$ and the biasing value $DC_i$ calculated by the above equation as illustrated in FIG. 15.

Figure 15:
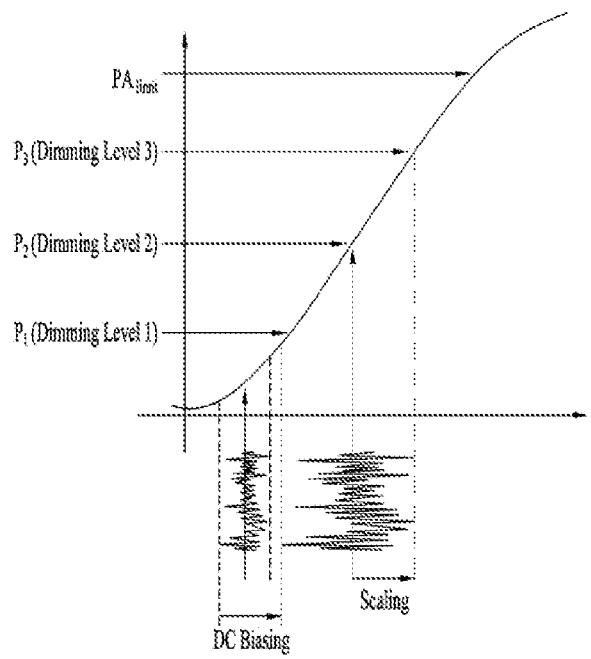
FIG. 15 is a diagram illustrating dimming control by applying signal scaling and DC biasing to an analog signal, performed by a transmitter in a VLC system according to an aspect of the present disclosure.

FIG. 15 is a diagram illustrating a method of performing dimming control based on signal scaling of an analog signal in a non-linear device and DC biasing through bias current.

According to the method illustrated in FIG. 15, a transmitter applies dimming control including maximum analog signal scaling and minimum DC biasing to a signal. Then, a receiver may optimally obtain SNR gain. Since a biasing value, which is a constant value, is information to be eliminated for decoding, a reduction ratio of a signal power is decreased as the biasing value is decreased in terms of SNR, so that SNR loss may be minimized. In contrast, SNR in the receiver may be maximally maintained by maximally performing analog signal scaling. An operation algorithm of the analog dimming control unit performing dimming control while maintaining the above characteristics is as illustrated in FIG. 16.

Figure 16:
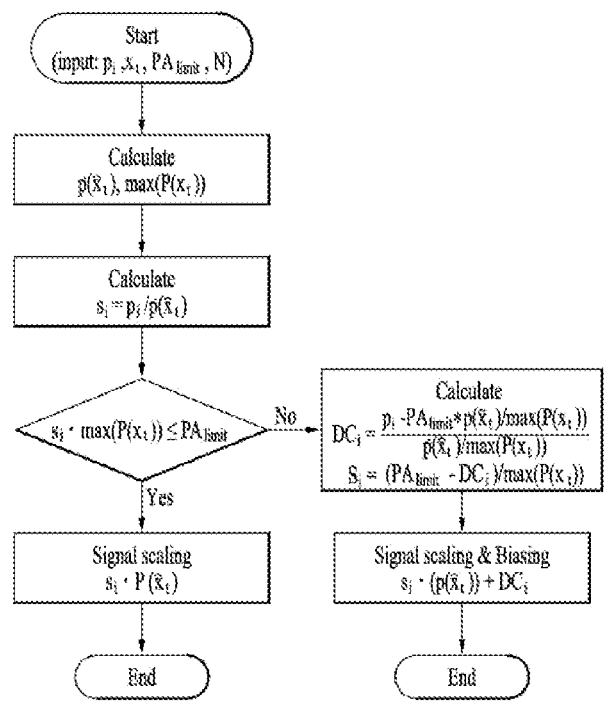
FIG. 16 is a flowchart illustrating Algorithm 1 for analog dimming control according to an aspect of the present disclosure.

FIG. 16 is a flowchart illustrating Algorithm 1 for analog dimming control performing DC biasing after optimal signal scaling. In Algorithm 1, the analog dimming control unit performs the following operation.

1) $p_i$, $x_t$, $PA_{limit}$, and N are received as input information to calculate $\bar{p}(\hat{x}_t)$ and $\max(P(x_t))$.

2) A scaling value $s_i = p_i/\bar{p}(\hat{x}_t)$ is calculated. If $s_i \cdot \max(P(x_t)) \leq PA_{limit}$ is satisfied, 2-1) the scaling value: $s_i = p_i/\bar{p}(\hat{x}_t)$ and a biasing value: $DC_i = 0$ are obtained, and 2-2) signal scaling is performed using $s_i \cdot P(\hat{x}_t)$.

3) The scaling value $s_i = p_i/\bar{p}(\hat{x}_t)$ is calculated. If $s_i \cdot \max(P(x_t)) \leq PA_{limit}$ is not satisfied, 3-1) the scaling value: $s_i = (PA_{limit} - DC_i)/\max(P(x_t))$ and the biasing value:

$$DC_i = \frac{p_i - PA_{limit} * \bar{p}(\hat{x}_t)/\max(P(x_t))}{\bar{p}(\hat{x}_t)/\max(P(x_t))}$$

are obtained, and 3-2) signaling scaling and DC biasing are performed using $s_i \cdot (P(\hat{x}_t)) + DC_i$.

Implementation 1 Algorithm 2 (Signaling Scaling is Performed after DC Biasing)

Algorithm 2 is an analog dimming control algorithm for minimizing a biasing value while maximizing a scaling value in order to maximize SNR gain of a receiver signal. Algorithm 2 means performing DC biasing through bias current and then performing signal scaling through an E-to-O device (LED, etc.) of the non-linear device of FIG. 14.

A signal scaling value and a DC biasing value according to a demanded dimming level i is as follows.

1) Object to. $\max(s_i - DC_i)$
2) Subject to. 2-1) $s_i \leq s_m$, 2-2) $DC_i \geq 0$
2-3) $s_i \cdot \max(P(x_t)) + DC_i \leq PA_{limit}$, 2-4) $(\Sigma_j^N s_i \cdot (x_t^j)^2 + DC_i)/N = P_i$ Here, the above information is defined as follows.

1) Biasing value for the demanded i-th dimming level: $DC_i$
2) Mean power of time domain symbols for the demanded i-th dimming level: $p_i$
3) Scaling value for the demanded i-th dimming level: $s_i$
4) Maximum scaling value: $s_m = PA_{limit}/\max(P(x_t))$
5) Limited condition of power amplifier: $PA_{limit}$ (determined by non-linear device)
6) Frequency domain symbol vector: $X_f$
7) Time domain symbol vector: $x_t = \text{IFFT}(X_f)$
8) Unipolar time domain symbol vector: $\hat{x}_t = x_t - \min(x_t)$ (for DCO-OFDM), $\hat{x}_t = x_t$ (for ACO-OFDM)
9) Mean power of time domain signal: $\bar{p}(\hat{x}_t) = \text{mean}(\hat{x}_t^2)$
10) Power of time domain symbols: $P(\hat{x}_t) = \hat{x}_t^2$
11) FFT size: N That is, as illustrated in FIG. 14, the DCO-OFDM modulation transmitter of the VLC system DC-biases the strength of the time-domain analog signal applied to the LED through bias current control based on the biasing value $DC_i$. Derived by the analog dimming control unit and scale the time-domain analog signal through the scaling value $s_i$. Then, dimming control according to a demanded dimming level may be performed through the scaling value $s_i$ and the biasing value $DC_i$ calculated by the above equation as illustrated in FIG. 15.

Since Algorithm 2 performs dimming control through the maximum analog signal scaling and minimum DC biasing by the same method as Algorithm 1, SNR gain may be optimally obtained in terms of the receiver. The biasing value is a constant value and the constant value in signal power is information to be eliminated for decoding. Accordingly, since the ratio of a desired signal power in total signal power is increased as the biasing value is decreased in terms of the SNR, SNR loss may be minimized. In addition, the SNR may be maximally maintained in terms of the receiver by maximally performing analog signal scaling.

Figure 17:
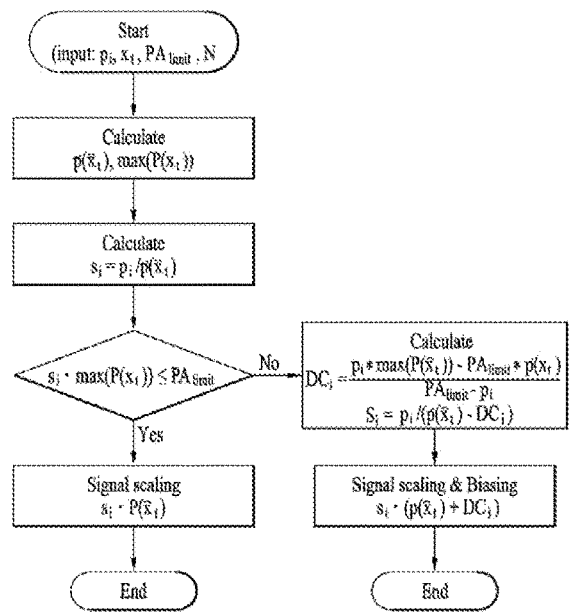
FIG. 17 is a flowchart illustrating Algorithm 2 for analog dimming control according to an aspect of the present disclosure.

An operation algorithm of the analog dimming control unit performing dimming control while maintaining the above characteristic is as illustrated in FIG. 17.

FIG. 17 is a flowchart illustrating Algorithm 2 for analog dimming control performing signal scaling after optimal DC biasing. In Algorithm 2, the analog dimming control unit performs the following operation.

1) $p_i$, $x_t$, $PA_{limit}$, and N are received as input information to calculate $\bar{p}(\hat{x}_t)$ and $\max(P(x_t))$ 2) A scaling value $s_i=p_i/\bar{p}(\hat{x}_t)$ is calculated. If $s_i \cdot \max(P(x_t)) \le PA_{limit}$ is satisfied, 2-1) the scaling value: $s_i=p_i/\bar{p}(\hat{x}_t)$ and a biasing value: $DC_i=0$ are obtained, and 2-2) signal scaling is performed using $s_i \cdot P(\hat{x}_t)$ 3) The scaling value $s_i=p_i/\bar{p}(\hat{x}_t)$ is calculated. If $s_i \cdot \max(P(x_t)) \le PA_{limit}$ is not satisfied, 3-1) the scaling value: $s_i=p_i/(\bar{p}(\hat{x}_t)-DC_i)$ and the $$DC_i = \frac{p_i * \max(P(x_t)) - PA_{limit} * \bar{p}(\hat{x}_t)}{PA_{limit} - p_i}$$

are obtained, and 3-2) DC biasing and signal scaling are performed using $s_i \cdot (P(\hat{x}_t)+DC_i)$.

Figure 18:
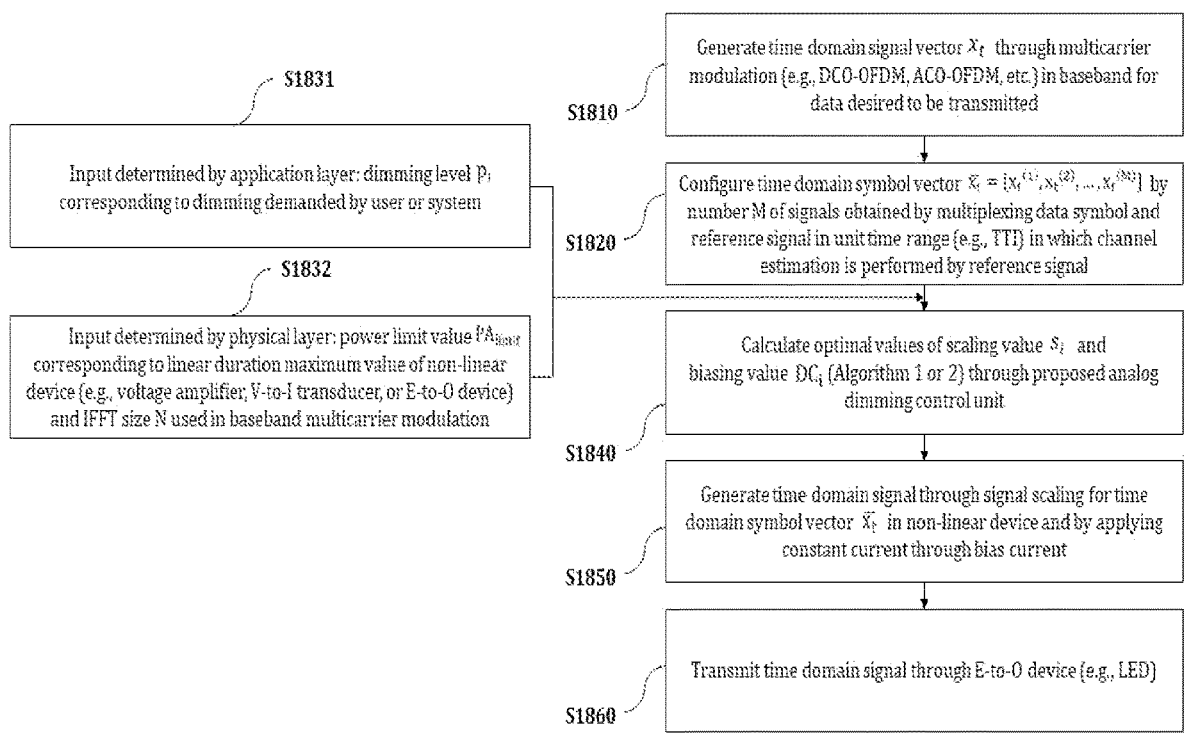
FIG. 18 is a flowchart illustrating operation of a transmitter performing analog dimming control according to an aspect of the present disclosure.

FIG. 18 is a flowchart illustrating operation of a transmitter performing analog dimming control according to an aspect of the present disclosure. Each step is described below.

S1810: Generate a time domain signal vector $x_t$ through multicarrier modulation (e.g., DCO-OFDM, ACO-OFDM, etc.) in a baseband for data desired to be transmitted S1820: Configure a time domain symbol vector $\bar{x}_t=[x_t^{(1)}, x_t^{(2)}, \ldots, x_t^{(M)}]$ by the number M of signals obtained by multiplexing a data symbol and a reference signal in a unit time range (e.g., transmission time interval (TTI)) in which channel estimation is performed by the reference signal S1831: Input determined by an application layer: a dimming level $p_i$ corresponding to dimming demanded by a user or a system S1832: Input determined by a physical layer: a power limit value $PA_{limit}$ corresponding to a linear duration maximum value of a non-linear device (e.g., a voltage amplifier, a V-to-I transducer, or an E-to-O device) and IFFT size N used in baseband multicarrier modulation S1840: Calculate optimal values of a scaling value $s_i$ and a biasing value $DC_i$ (Algorithm 1 or 2) through the proposed analog dimming control unit S1850: Generate a time domain signal through signaling scaling for the time domain symbol vector $\bar{x}_t$ in the non-linear device and by applying constant current through bias current S1860: Transmit the time domain signal through the E-to-O device (e.g., LED)

While the above operations have been described based on DCO-OFDM, the same principle may be applied to the transmitter of the VLC system using multi-carrier modulation.

Figure 19:
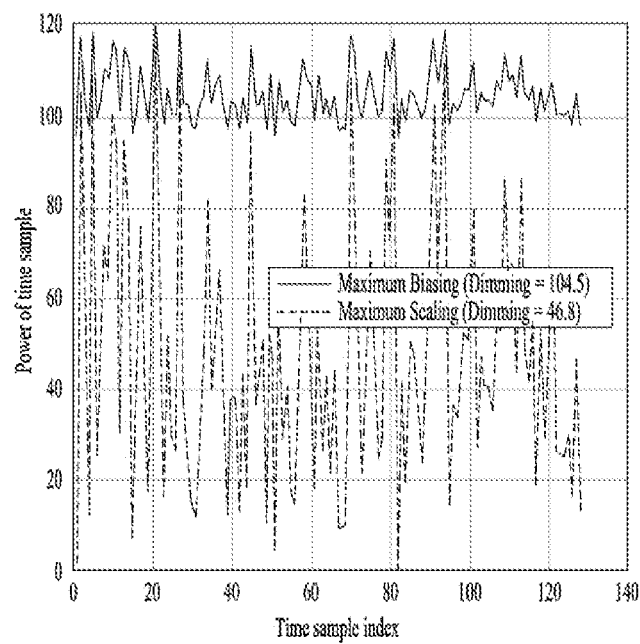
FIG. 19 is a diagram illustrating an example of operation of an analog dimming control unit according to an aspect of the present disclosure.

FIG. 19 is a diagram illustrating an example of operation of an analog dimming control unit according to an aspect of the present disclosure.

It is assumed that a transmitter of a VLC system based on DCO-OFDM modulation is used. A situation in which an FFT size is 128, $PA_{limit}=120$, $P_1=30$, $P_2=50$, $P_3=80$, expected power of a time domain signal: $\bar{P}(x_t)=9.8881$, and an expected SNR before signal scaling: $10\log_{10}(\bar{P}(x_t)/\sigma^2)=0$ dB is assumed. In this case, time domain signal forms for maximum biasing (when maximum dimming efficiency is targeted) and maximum scaling (when maximum SNR gain is targeted under the assumption of a PA model of a legacy RF communication system) are as illustrated in FIG. 19.

In FIG. 19, when maximum biasing is performed, a biasing value is $DC_{max}=94.6540$. In this case, a dimming level may be 104.5 and an effective SNR of a receiver will still be 0 dB. In contrast, when maximum scaling is performed, a scaling value is $s_m=4.7345$ and, in this case, the dimming level may be 46.8 and the effective SNR of the receiver may be 6.75 dB which is an increased value. Here, the effective SNR indicates an increased degree of amplitude change of a signal as compared with the case in which scaling is not performed and the effective SNR is not an absolute value. That is, maximum biasing has a high degree of freedom for dimming control but has no gain in terms of the effective SNR of the receiver. In contrast, maximum scaling has a low degree of freedom for dimming control but may achieve the highest gain in terms of the effective SNR of the receiver. The above description may be given based on a legacy RF system. In the legacy RF communication system, maximum scaling is a basic operation of the power amplifier.

Figure 20:
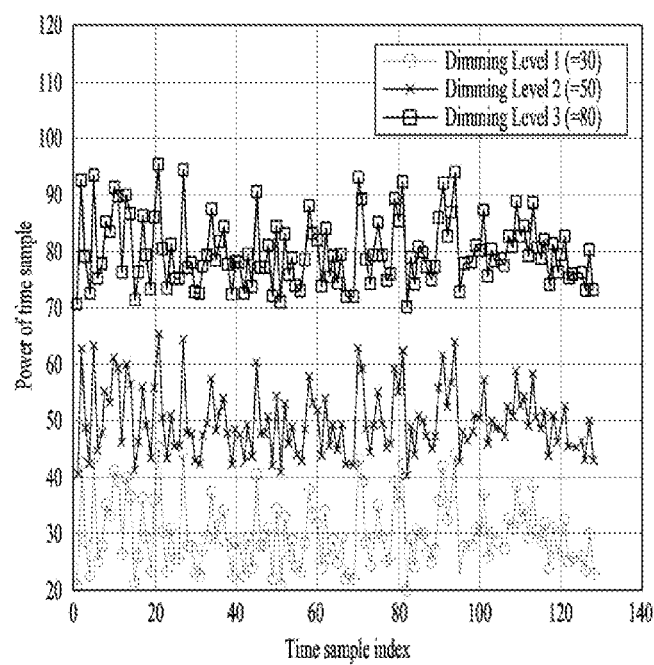
FIG. 20 is a graph illustrating signal forms when dimming control to which DC biasing is applied is performed.

If dimming control is performed based on DC biasing, signal forms as illustrated in FIG. 20 may be expected. When DC biasing is performed according to dimming levels, biasing values may be obtained as $[DC_1, DC_2, DC_3]=[20.1119, 40.1119, 70.1119]$. In this case, scaling values are $[s_1, s_2, s_3]=[0, 0, 0]$ and effective SNRs are $[SNR_1, SNR_2, SNR_3]=[0, 0, 0]$.

Figure 21:
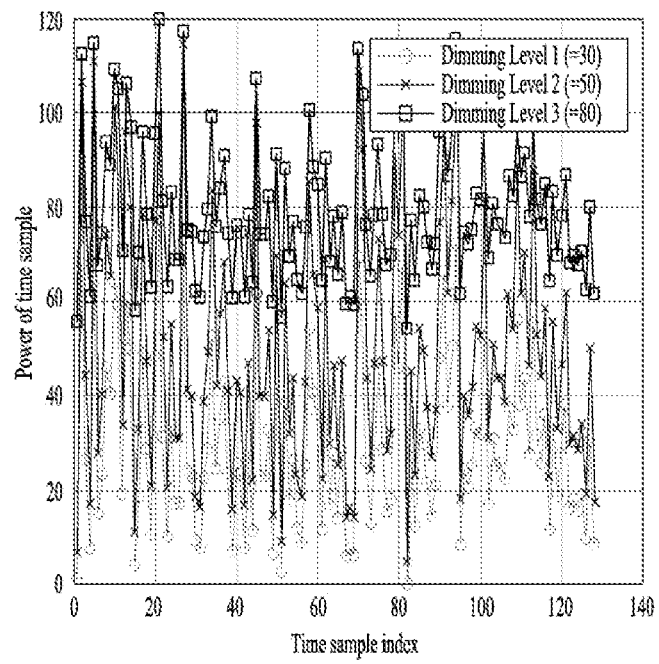
FIG. 21 is a graph illustrating signal forms when dimming control to which DC biasing and signal scaling is applied according to Algorithm 1 of FIG. 16 is performed.

In contrast, analog dimming control is performed based on optimal scaling values and optimal biasing values by Algorithm 1, signal forms as illustrated in FIG. 21 may be expected. According to dimming levels, the biasing values may be obtained as $[DC_1, DC_2, DC_3]=[0, 5.2226, 54.4129]$. In this case, the scaling values are $[s_1, s_2, s_3]=[3.0340, 4.5284, 2.5877]$, and the effective SNRs are $[SNR_1, SNR_2, SNR_3]=[4.82, 6.56, 4.13]$.

Even if analog dimming control is performed based on optimal scaling values and biasing values by Algorithm 2, the same signal forms as the above signals may be expected. According to dimming levels, biasing values may be obtained as $[DC_1, DC_2, DC_3]=[0, 1.1523, 21.0277]$. In this case, scaling values are $[s_1, s_2, s_3]=[3.0340, 4.5284, 2.5877]$ and effective SNRs are $[SNR_1, SNR_2, SNR_3]=[4.82, 6.56, 4.13]$. That is, a final result may obtain the same form as the above case but there may be a difference in a biasing value according to an order of biasing and scaling.

Implementation 2: Analog Dimming Control Based Reference Signal Configuration Method According to analog dimming control previously described in Implementation 1, an operation unit of the analog dimming control unit is maintained constant during the range of a data symbol using channel information estimated from a reference signal. For example, if there is one reference signal in one time slot and the reference signal is used for channel estimation for 6 data symbols, this may be represented as illustrated in FIG. 22.

Figure 22:
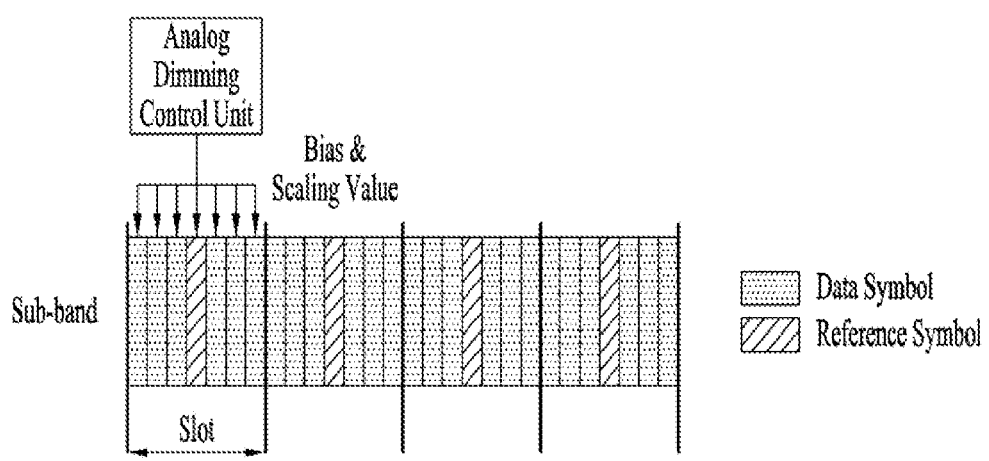
FIGS. 22 and 23 are diagrams illustrating a method of configuring an analog dimming control based reference signal according to an aspect of the present disclosure.

Referring to FIG. 22, analog dimming control information (e.g., a scaling value and a biasing value) applied to a reference signal is obtained for all data symbols in a unit time during which channel estimation is performed by the reference signal.

A time domain symbol vector may be represented as $\bar{x}_t=[x_t^{(1)}, x_t^{(2)}, \ldots, x_t^{(M)}]$ in which M is the number of data symbols in a unit time range in which channel estimation is performed by the reference signal. Therefore, the scaling value and the biasing value are obtained by the time domain symbol vector $\bar{x}_t$ and Algorithm 1 or Algorithm 2 of Implementation 1.

The analog dimming control unit performs dimming control by applying the same scaling value and biasing value to the reference signal and data symbols in a unit time range in which channel estimation is performed by the reference signal.

The receiver derives a DC biasing value and a scaling value based on the reference signal pre-agreed on by the above method. The scaling value may be combined with a channel effect to serve as channel gain and decoding may be performed based on the derived channel gain.

Figure 23:
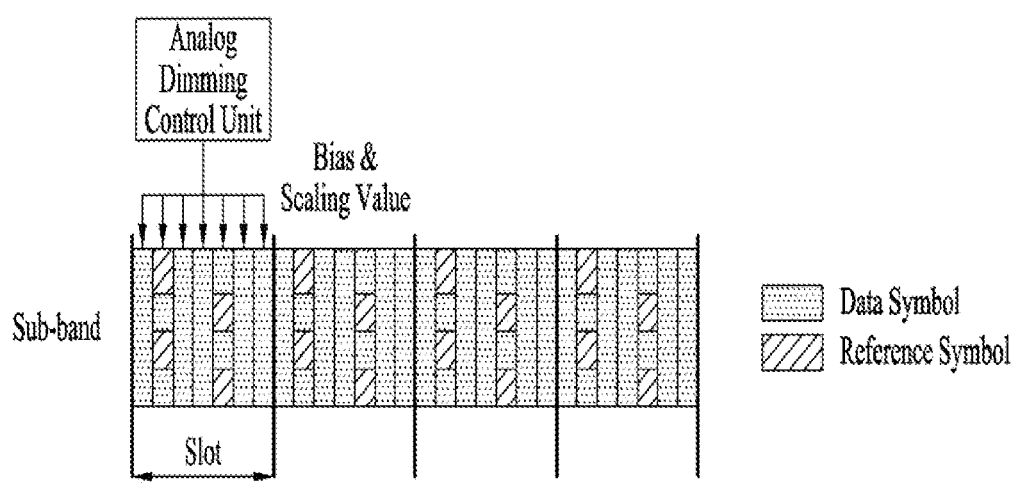

Similarly to the case of FIG. 22, if the reference signal and the data symbol are subjected to FDM or FDM/TDM to be distributed in one time slot and 6 data symbols are used for channel estimation, this may be represented as in FIG. 23.

Referring to FIG. 23, analog dimming control information (e.g., a scaling value and a biasing value) applied to a reference signal is obtained for all data symbols in a unit time during which channel estimation is performed by the reference signal. That is, analog dimming control is performed based on an OFDM signal obtained by multiplexing the reference signal and a data symbol through FDM.

A time domain symbol vector may be expressed as $\bar{x}_t=[x_t^{(1)}, x_t^{(2)}, \ldots, x_t^{(M)}]$ in which M is the number of signals obtained by multiplexing the data symbol and the reference signal in a unit time range in which channel estimation is performed by the reference signal.

Thus, a scaling value and a biasing value are obtained by the time domain symbol vector $\bar{x}_t$ and Algorithm 1 or Algorithm 2 of Implementation 1.

The analog dimming control unit performs dimming control by applying the same scaling value and biasing value to the reference signal and data symbols in a unit time range in which channel estimation is performed by the reference signal.

A method of transmitting a signal by a transmitter performing VLC according to an aspect of the present disclosure may include modulating a signal, and transmitting the modulated signal to which analog dimming control is applied. The analog dimming control may include biasing for the modulated signal and scaling for the modulated signal.

The analog dimming control may be performed by a voltage amplifier, a voltage-to-current (V-to-I) transducer, and an electrical-to-optical (E-to-O) device of the transmitter.

Application layer input and physical layer input may be used as input for the analog dimming control. The application layer input may include a dimming level demanded by a system, and the physical layer input may include a maximum power limit value of the transmitter and an inverse fast Fourier transform (IFFT) magnitude used to modulate the signal.

A maximum value may be applied to scaling for the modulated signal and a minimum value may be applied to biasing for the modulated signal.

Equal analog dimming control may be applied to a reference signal and to a data symbol in a unit time during which channel estimation is performed through the reference signal.

A receiver receiving the signal may obtain information related to biasing and scaling for the modulated signal using the reference signal.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

Those skilled in the art will appreciate that the present disclosure may be embodied in other specific forms than those set forth herein without departing from the spirit and essential characteristics of the present disclosure. The above description is therefore to be construed in all aspects as illustrative and not restrictive. The scope of the present disclosure should be determined by reasonable interpretation of the appended claims and all changes coming within the equivalency range of the present disclosure are intended to be within the scope of the present disclosure.

Various embodiments for carrying out the present disclosure have been described in the best mode for carrying out the disclosure.

The above description is to be construed in all aspects as illustrative and not restrictive. The scope of the present disclosure should be determined by reasonable interpretation of the appended claims and all changes coming within the equivalency range of the present disclosure are intended to be within the scope of the present disclosure.

The present disclosure is industrially applicable to various wireless communication systems such as a 3GPP LTE/LTE-A system and a 5G system.

What is claimed is:

1. A method of transmitting a signal by a transmitter performing visible light communication, the method comprising:
    modulating a signal; and
    transmitting the modulated signal to which analog dimming control is applied,
    wherein the analog dimming control includes biasing for the modulated signal and scaling for the modulated signal, and
    wherein equal analog dimming control is applied to a reference signal and to a data symbol in a unit time during which channel estimation is performed through the reference signal.

2. The method of claim 1, wherein the analog dimming control is performed by a voltage amplifier, a voltage-to-current (V-to-I) transducer, and an electrical-to-optical (E-to-O) device of the transmitter.

3. The method of claim 1,
wherein application layer input and physical layer input are used as input for the analog dimming control, and
wherein the application layer input includes a dimming level demanded by a system, and the physical layer input includes a maximum power limit value of the transmitter and an inverse fast Fourier transform (IFFT) magnitude used to modulate the signal.

4. The method of claim 1, wherein a maximum value is applied to scaling for the modulated signal and a minimum value is applied to biasing for the modulated signal.

5. The method of claim 1, wherein a receiver receiving a signal obtains information related to biasing and scaling for the modulated signal using the reference signal.

6. A transmitter for transmitting a signal through visible light communication, the transmitter comprising:
a transceiver; and
a processor configured to modulate a signal and control the transceiver to transmit the modulated signal to which analog dimming control is applied,
wherein the analog dimming control includes biasing for the modulated signal and scaling for the modulated signal, and
wherein the processor applies equal analog dimming control to a reference signal and to a data symbol in a unit time during which channel estimation is performed through the reference signal.

7. The transmitter of claim 6, wherein the analog dimming control is performed by a voltage amplifier, a voltage-to-current (V-to-I) transducer, and an electrical-to-optical (E-to-O) device of the transmitter.

8. The transmitter of claim 6,
wherein the processor uses application layer input and physical layer input as input for the analog dimming control, and
wherein the application layer input includes a dimming level demanded by a system, and the physical layer input includes a maximum power limit value of the transmitter and an inverse fast Fourier transform (IFFT) magnitude used to modulate the signal.

9. The transmitter of claim 6, wherein the processor applies a maximum value to scaling for the modulated signal and applies a minimum value to biasing of the modulated signal.

10. The transmitter of claim 6 wherein a receiver receiving a signal obtains information related to biasing and scaling for the modulated signal using the reference signal.

\* \* \* \* \*